United States Patent
Ohtaka (10) Patent No.: US 7,760,119 B2
(45) Date of Patent: Jul. 20, 2010

(54) WAVEFORM GENERATOR AND TEST APPARATUS

(75) Inventor: Taichi Ohtaka, Tokyo (JP)

(73) Assignee: Advantest Corporation, Tokyo (JP)

( * ) Notice: Subject to any disclaimer, the term of this patent is extended or adjusted under 35 U.S.C. 154(b) by 0 days.

(21) Appl. No.: 12/051,790

(22) Filed: Mar. 19, 2008

(65) Prior Publication Data

US 2008/0246641 A1      Oct. 9, 2008

(30) Foreign Application Priority Data

Mar. 20, 2007     (JP) ............................... 2007-073493

(51) Int. Cl.
*H03M 1/66* (2006.01)
(52) U.S. Cl. .................. 341/147; 341/144; 708/272; 327/106
(58) Field of Classification Search .................. 341/147, 341/144; 327/106; 708/272
See application file for complete search history.

(56) References Cited

U.S. PATENT DOCUMENTS

| 4,404,644 | A | * | 9/1983 | Howie ........................ 708/273 |
| 4,782,324 | A | * | 11/1988 | Underwood ................. 341/147 |
| 5,517,156 | A | * | 5/1996 | Ikuzawa ...................... 327/106 |
| 5,859,605 | A | * | 1/1999 | Raghavan et al. ........... 341/143 |
| 6,057,715 | A | * | 5/2000 | Kawasaki .................... 327/106 |
| 6,356,224 | B1 | * | 3/2002 | Wohlfarth .................... 341/147 |
| 6,477,123 | B1 | * | 11/2002 | Hutter ..................... 369/47.32 |
| 7,385,543 | B2 | * | 6/2008 | Jungerman ................... 341/144 |
| 2001/0019313 | A1 | * | 9/2001 | Takahashi et al. ........... 341/147 |

FOREIGN PATENT DOCUMENTS

JP        06-337140        12/2006

* cited by examiner

*Primary Examiner*—Howard Williams
(74) *Attorney, Agent, or Firm*—Martine Penilla & Gencarella, LLP (57) ABSTRACT

The purpose is to provide a waveform generator that generates signals with a frequency lower than the minimum sampling frequency of the DAC.

In the waveform generator 10, the clock generator 106 generates a clock signal 140. The frequency divider 112 divides the frequency of the clock signal 140 and generates the frequency-divided clock signal 144. The reader 118 provides an address signal at the period of frequency-divided clock signal 144 for the waveform memory 120 and reads the pattern data from the waveform memory 120 into the DAC 130. The DAC 130 converts the data provided from the waveform generator 120 at the period of clock signal 140 into an analog value and outputs a waveform of arbitrary shape.

6 Claims, 7 Drawing Sheets

WAVEFORM GENERATOR AND TEST APPARATUS

BACKGROUND OF THE INVENTION

1. Field of the Invention

The present invention generally relates to a waveform generator that generates a desired waveform, and more particularly, to a waveform generator that generates a waveform for testing a semiconductor device having an analog circuit and to a test apparatus comprising the waveform generator.

2. Description of the Related Art

In testing a semiconductor device containing an analog circuit, a waveform generator is used to generate test signals which are input into a tested device. The waveform generator generates desired test waveforms by allowing a digital analog converter (hereinafter also referred to as a "DAC") to convert the digital data, indicating a waveform pattern to be generated, into analog signals. In testing a device, a signal output from the device under test when a test signal is input is compared with an expected value signal and the device under test is determined to be good or not (e.g., see JP 2006-337140).

In recent years, devices with high speed performance are actively developed. Therefore, test apparatuses are expected to operate at a higher speed than devices that are tested. In this background, test apparatuses for testing analog circuits generally comprise DACs operating at high speeds.

On one hand, analog circuits that operate at high speeds are developed; on the other hand, semiconductor devices incorporating analog circuits that operate at low speeds still exist. For a DAC, the minimum sampling frequency is defined by default. This limits the minimum frequency of a waveform produced by a waveform generator to the minimum sampling frequency of the DAC. Thus, it is difficult to test a semiconductor device that operates at a low speed, by using a test apparatus that is equipped with a DAC meeting with high speed specification. A similar problem arises in case where a circuit other than a DAC limits the minimum operation frequency, and it becomes difficult to test a semiconductor device that operates at low speed.

SUMMARY OF THE INVENTION

In this background, the purpose of the invention is to provide a technique for defining arbitrarily the frequency of a waveform to be generated.

According to one embodiment of the present invention, a waveform generator for generating a waveform is provided, in order to solve the problem described above. The waveform generator comprises: a memory operative to retain pattern data indicating a pattern of a waveform; a clock signal generator operative to generate a clock signal; a reader operative to read the pattern data from the memory at a frequency obtained by dividing the frequency of the clock signal; and a digital-to-analog converter operative to output, at the frequency of the clock signal, a waveform based on the read pattern data.

According to this embodiment, a cycle period for providing the pattern data to the digital-to-analog converter can be set longer than the sampling frequency of the digital-to-analog converter. Therefore, the digital-to-analog converter can convert the same data value into analog values over a range of a plurality of successive sampling periods. Thus, the sampling period of the digital-to-analog converter can be seemingly extended and the frequency of the output waveform can be decreased than that of the clock signal.

The waveform generator may further comprise a frequency divider operative to divide the frequency of the clock signal and the frequency divider may provide a clock signal with divided frequency to the reader. This allows the reader to read the pattern data at a period of the frequency-divided clock signal. The frequency divider may divide the frequency of the clock signal by thinning out the pulses of the clock signals. This allows the frequency divider having a simple structure to divide the frequency of the clock signal.

According to another embodiment of the present invention, a test apparatus is provided. The test apparatus includes a waveform generator for providing a test waveform to a device to be tested. The test apparatus may include the waveform generator according to the embodiment described above. By allowing the waveform generator to decrease the frequency of an output waveform in comparison with that of the clock signal, a device to be tested having an operation frequency lower than that of the clock signal can be tested, effectively.

Optional combinations of the aforementioned constituting elements, and implementations of the invention in the form of methods, apparatuses and systems may also be practiced as additional modes of the present invention.

DETAILED DESCRIPTION OF THE INVENTION

The invention will now be described by reference to the preferred embodiments. This does not intend to limit the scope of the present invention, but to exemplify the invention.

Figure 1:
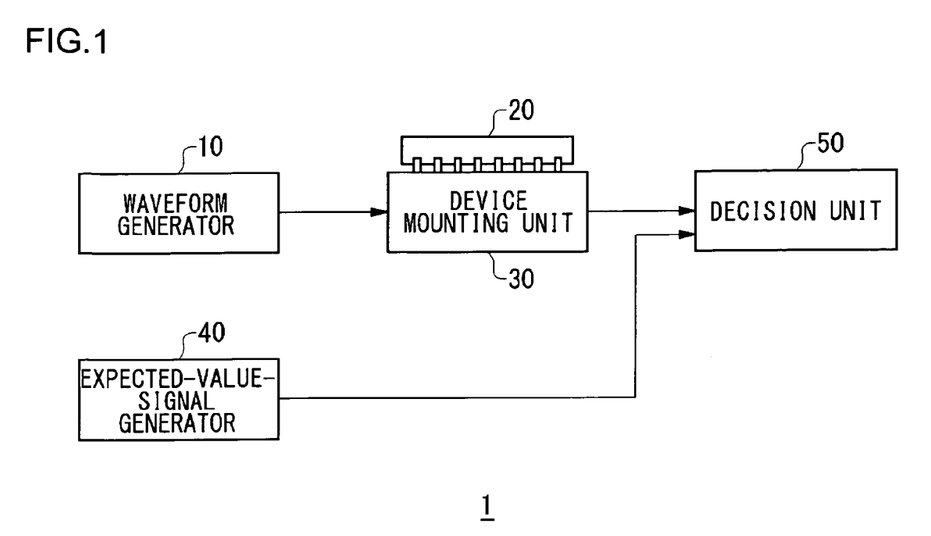
FIG. 1 shows an exemplary structure of a test apparatus according to an embodiment of the present invention.

FIG. 1 shows an exemplary structure of a test apparatus 1 according to an embodiment of the present invention. The test apparatus 1 is an apparatus for testing a device under test (hereinafter also referred to as a "DUT") 20 and comprises a waveform generator 10, a device mounting unit 30, an expected-value-signal generator 40 and a decision unit 50. In the present embodiment, the DUT 20 is a semi-conductor device containing an analog circuit and is mounted on the device mounting unit 30.

The waveform generator 10 generates an analog test signal to be provided for the analog circuit of the DUT 20. The device mounting unit 30 inputs the test signal into the DUT 20 and provides a signal output from the DUT 20 to the decision unit 50. The expected-value-signal generator 40 generates an expected value signal that the DUT 20 should output in response to the test signal. The decision unit 50 compares the output signal provided from the device mounting unit 30 and the expected value signal provided from the expected-value-signal generator 40 and determines whether the DUT 20 is functioning properly.

Figure 2:
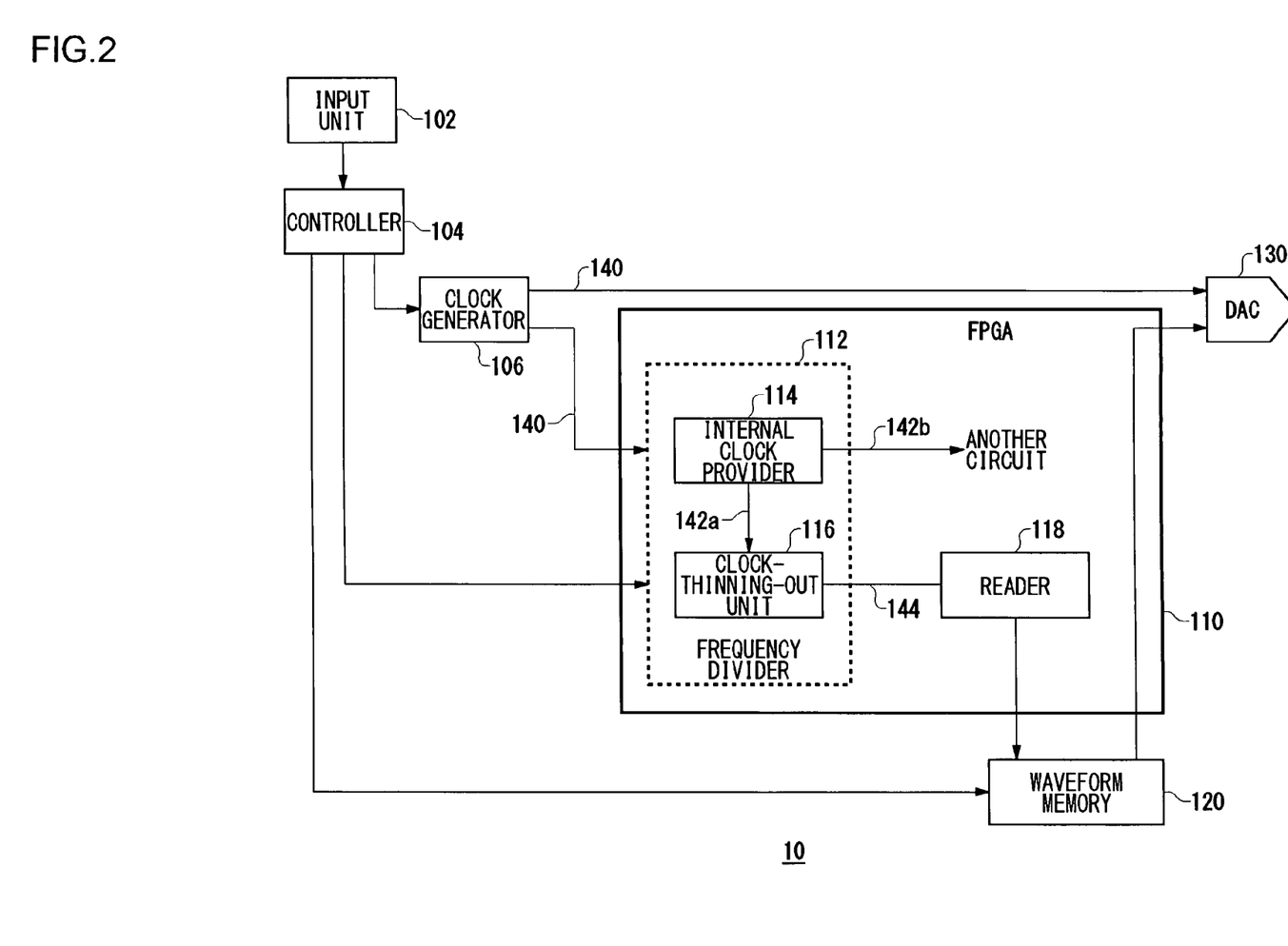
FIG. 2 shows an exemplary structure of a waveform generator.

FIG. 2 shows an exemplary structure of the waveform generator 10. The waveform generator 10 has a function to generate an analog arbitrary waveform and comprises an input unit 102, a controller 104, a clock generator 106, an FPGA (Field Programmable Gate Array) 110, a waveform memory 120 and a digital-analog converter (Herein after referred to as a "DAC") 130. In the FPGA 110, a frequency divider 112 and a reader 118 are structured. The waveform generator 10 according to the present embodiment uses the DAC 130 specified for high-speed operation, the DAC 130 having the minimum sampling frequency of several tens of MHz. Further, for the FPGA 110, a certain range of operation frequencies is set.

The clock generator 106 is a clock signal generator that generates a clock signal with an arbitrary frequency. In case that the frequency range with which the FPGA 110 can operate is, for example, 200 MHz~800 MHz and the minimum sampling frequency of the DAC 130 is a several tens of MHz, it is preferable that the clock generator 106 generates a clock signal with a frequency more than 200 MHz in order to assure the operation of both the FPGA 110 and the DAC 130. Alternatively, in case that the minimum operation frequency for the FPGA is 100 MHz and the minimum sampling frequency for the DAC 130 is 200 MHz, it is preferable that the clock generator 106 generates a clock signal with a frequency of more than 200 MHz.

In this manner, the clock generator 106 generates a clock signal with a frequency more than the minimum operation frequencies for both the DAC 130 and the FPGA 110, so as to assure the stable operation of both units. These minimum operation frequencies are determined uniquely based on the specifications of their operations, respectively. The controller 104 may retain the minimum frequency of the clock signal 140 that allows both units to operate stably, based on their minimum operation frequencies.

The frequency divider 112 divides the frequency of the clock signal 140 that is generated by the clock generator 106 and generates a frequency-divided clock signal 144 to be provided for the reader 118. "Dividing a frequency" refers to outputting a signal with a frequency that is obtained by multiplying the frequency of the input signal by 1/N (N is an integer more than one). "Dividing a frequency" includes stretching the input signal along the time axis and/or generating a periodical clock signal by thinning out some pulses of the input signal. That is, the frequency divider 112 has a function to define the period between the rising edges and/or the period between falling edges of the clock signal to N times of that of the input signal. The duty ratio of the frequency-divided clock signal 144 may be any values.

The frequency divider 112 includes an internal clock provider 114 and a clock-thinning-out unit 116. The internal clock provider 114 makes the clock signal 140, sent from the clock generator 106, stable and provides a stable internal clock signal 142a, 142b to circuits in the FPGA 110. According to the present embodiment, the clock signal 140 allowing the FPGA 110 to operate is provided from the clock generator 106. Thus, the internal clock provider 114 generates an internal clock signal which has the same frequency as that of the clock signal 140; and provides the internal clock signal 142a to the clock-thinning-out unit 116 and the internal clock signal 142b to another circuit in the FPGA 110, accordingly. The clock-thinning-out unit 116 executes pulse thinning process of the internal clock signal 142a by making use of a counter or the like and generates the frequency-divided clock signal 144, accordingly.

Figure 3:
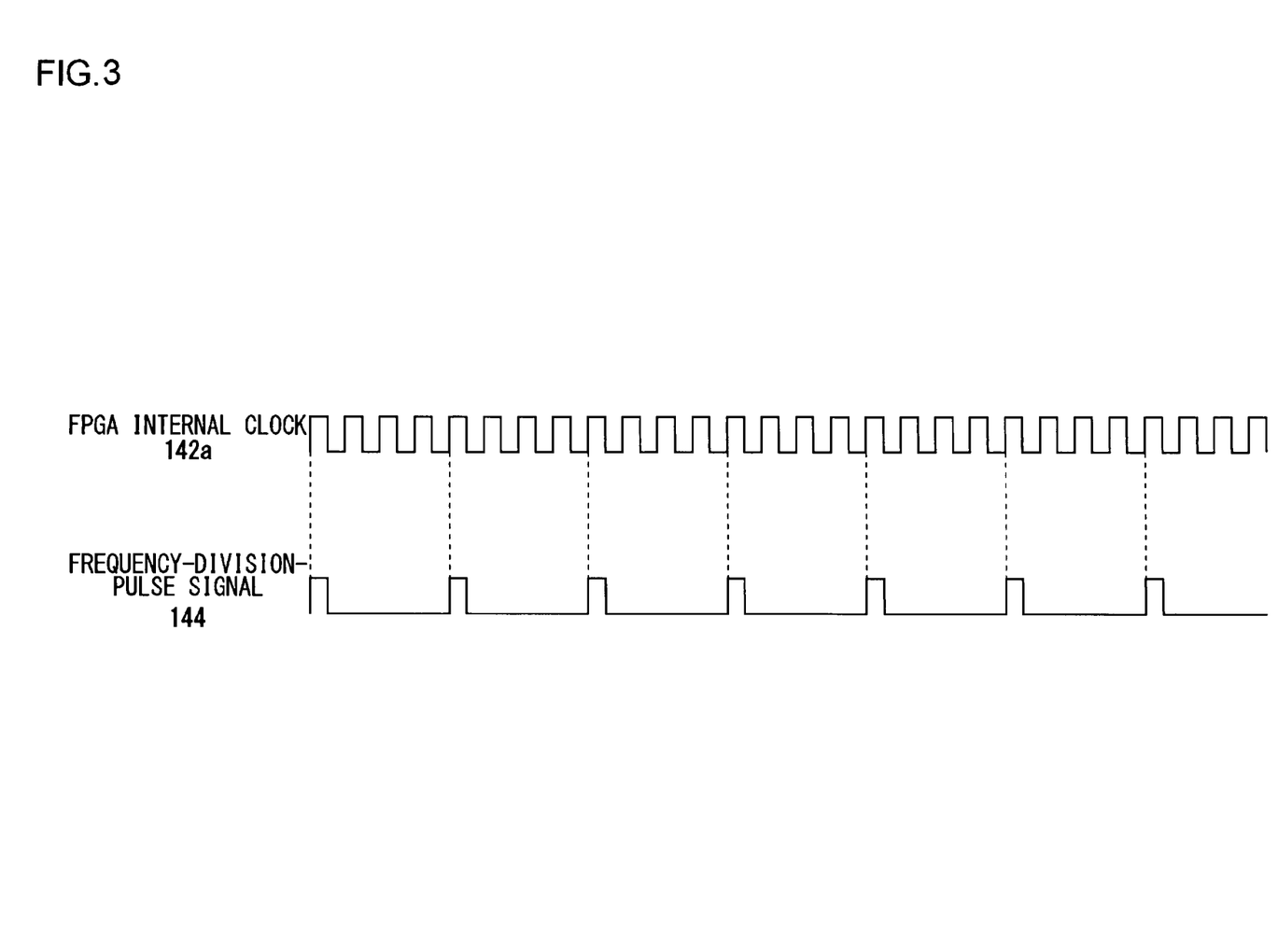
FIG. 3 shows the relation between an internal clock signal of an FPGA and the clock signal obtained by dividing the frequency of an internal clock signal.

FIG. 3 shows the relation between an internal clock signal of the FPGA and a clock signal obtained by dividing the frequency of the internal clock signal. In an example shown in FIG. 3, the clock-thinning-out unit 116 executes thinning-out processing of clock pulses so as one in four pulses, included in the internal clock signal 142a, remains with periodic intervals. By this, the clock-thinning-out unit 116 generates the frequency-divided clock signal 144 by frequency dividing the internal clock signal 142a by 4. According to the present embodiment, the internal clock signal 142a and the clock signal 140 have the same frequency. Therefore, the frequency-divided clock signal 144 corresponds to a divided-by-four clock signal 140. The frequency-divided clock signal 144 is provided to the reader 118.

The waveform memory 120 retains pattern data indicating a test waveform pattern for providing to the DUT 20. The pattern data is generated before starting a test by the controller 104, depending on the type of DUT 20. Then the pattern data is stored into the waveform memory 120. The reader 118 is an address controller and provides the waveform memory 120 with an address signal at a constant frequency of the frequency-divided clock signal 144, which is provided from the clock-thinning-out unit 116. This allows the reader 118 to read the pattern data from the waveform memory 120 at the frequency obtained by dividing the frequency of the clock signal 140.

The DAC 130 converts the pattern data provided from the waveform memory 120 into an analog value at the sampling period of the clock signal 140, provided from the clock generator 106, and outputs the converted pattern data, accordingly. In order to adjust the timing for inputting the clock signal 140 and the timing for inputting the pattern data into the DAC 130, a variable delay circuit that adjusts an amount of delay may be provided between the clock generator 106 and the FPGA 110.

Before giving an explanation on the waveform output from the DAC 130 in the present embodiment, a consideration will be given to a waveform output from the DAC 130 in case the FPGA 110 does not include the frequency divider 112.

Figure 4:
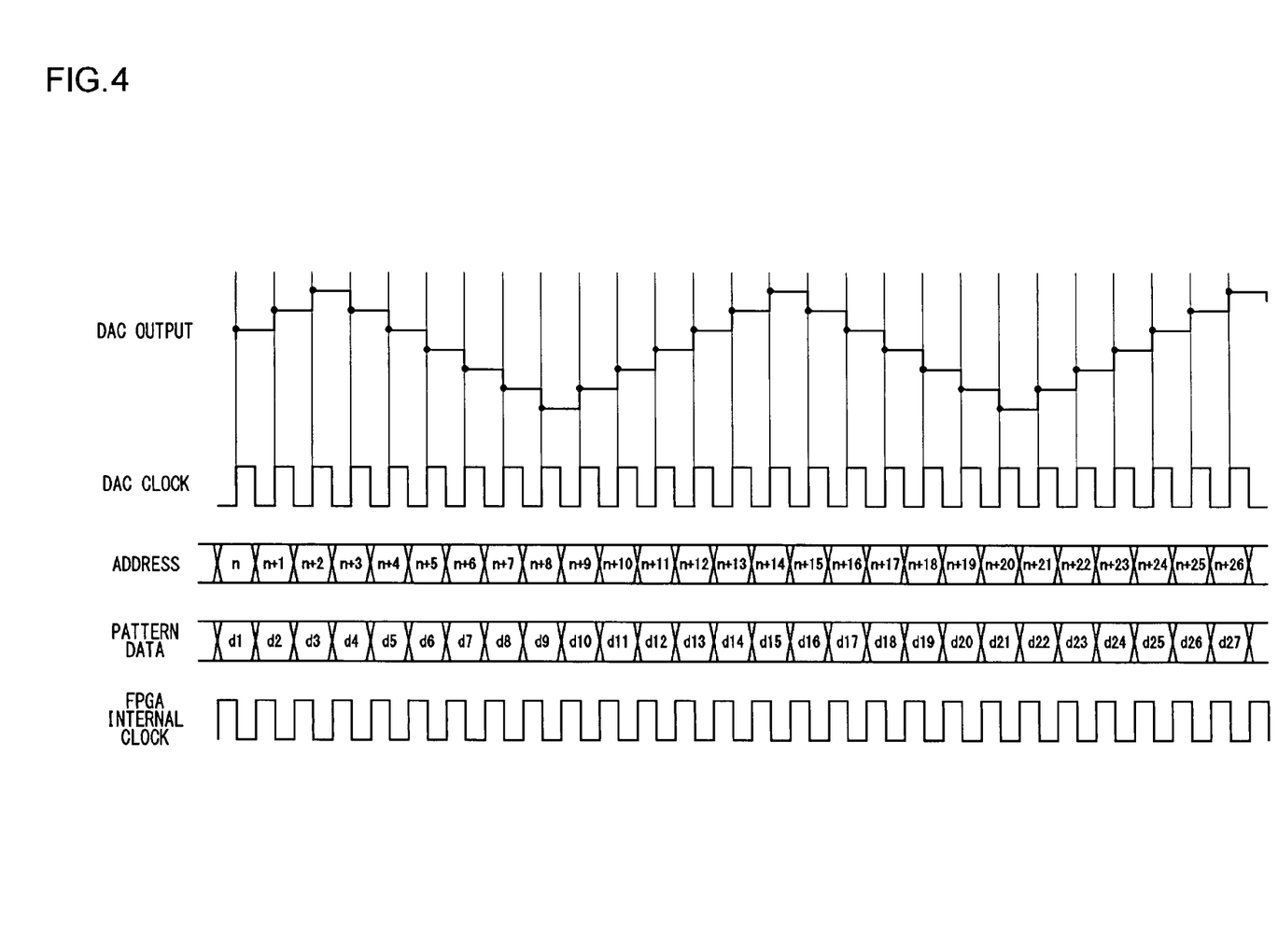
FIG. 4 shows a signal output from a DAC when pattern data is read out from a waveform memory at the internal clock period of the FPGA, which has the same frequency as that of the clock signal, in a waveform generator that does not contain the frequency divider.

FIG. 4 shows a signal output from the DAC 130 in case the pattern data is read out from the waveform memory 120 at the period of the internal clock of the FPGA, which has the same frequency as that of the clock signal 140, in the waveform generator 10 that does not contain the frequency divider 112. In FIG. 4, "DAC OUTPUT" indicates a waveform output from the DAC 130, "DAC CLOCK" indicates the pulse shape of the clock signal 140 provided to the DAC 130, "ADDRESS" indicates an address signal provided from the reader 118 to the waveform memory 120, "PATTERN DATA" indicates a pattern data signal read out from the waveform memory 120, and the "FPGA INTERNAL CLOCK" indicates an internal clock signal with the same frequency as that of the clock signal 140.

As shown in the FIG. 4, in case the frequency divider 112 is not provided; a read cycle for reading the pattern data from the waveform memory 120 becomes equal to the cycle of the DAC clock, and the waveform output from the DAC 130 varies with the cycle of the DAC clock. Therefore, in case the frequency with which the DUT 20 can operate is lower than that of the DAC clock, a problem arises that the output from the DAC can not be provided to the DUT 20.

This problem can be solved tentatively by processing the pattern data of the waveform memory 120 by using a certain technique. This solution approach makes use of pattern data having a repetition of a predetermined number of the same data values.

Figure 5:
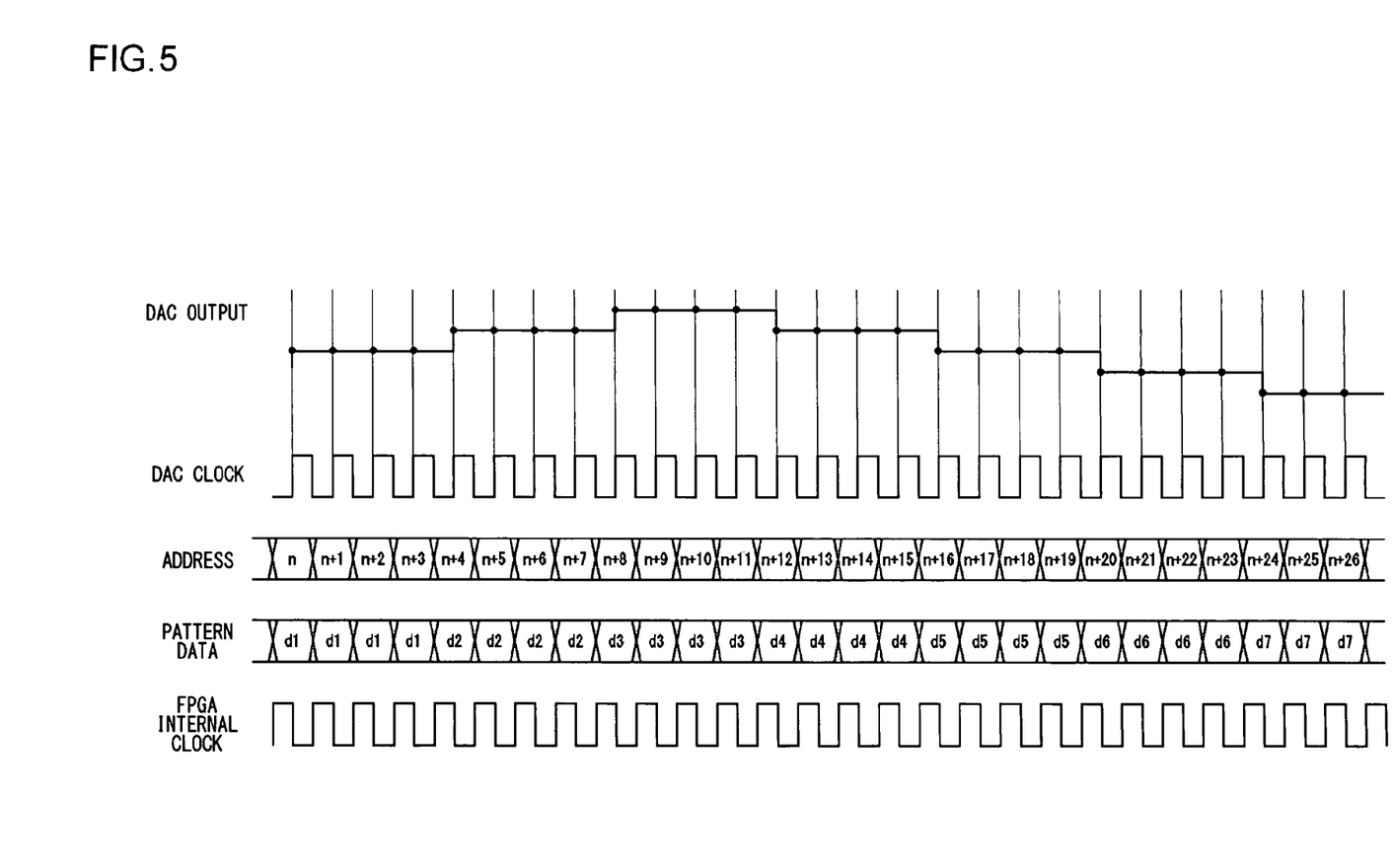
FIG. 5 shows a signal output from the DAC when pattern data, which has a repetition of a plurality of the same data values, is read out from the waveform memory at the cycle of the FPGA internal clock having the same frequency as that of the clock signal, in the waveform generator not containing the frequency divider.

FIG. 5 shows a signal output from the DAC 130 when the pattern data, which has a plurality of the same data values, is read out from the waveform memory 120 at the period of the FPGA internal clock having the same frequency as that of the clock signal 140, in the waveform generator 10 that does not contain the frequency divider 112. In this example, the pattern data that has a repetition of four same data values is used. By this, the frequency of a signal output from the DAC seemingly becomes one fourth of that of the clock signal 140. As a result, the frequency of the output from the DAC can be decreased.

However, in this case, the necessity arises that the waveform memory 120 retains a plurality of data values with overlaps. Therefore, a new problem arises that the available memory capacity of the waveform memory 120 is reduced. Especially, when there is some reason that the memory capacity of the waveform memory 120 can not be extended easily, the increase in the amount of pattern data is not preferable. In the present embodiment, these problems will be solved by providing the frequency divider 112.

In order to make the waveform generator 10 according to the present embodiment to operate, a user defines a frequency of a signal to be output from the DAC 130, by using the input unit 102. The frequency of output signals output of the DAC 130 corresponds to the frequency of the test signals input into the DUT 20. The controller 104 determines a frequency of the clock signal 140 and a frequency division ratio for the frequency divider 112, based on the defined frequency of output signals output of the DAC 130 and the frequencies with which the DAC 130 and the FPGA 110 can operate. As described above, in case the controller 104 retains, in advance, information on the minimum frequencies that allow the DAC 130 and the FPGA 110 to operate stably, based on that minimum frequencies and the defined output frequency of the DAC 130, the frequency of the clock signal 140 and the frequency division ratio for the frequency divider 112 may be determined.

For example, assume the frequency that allows the DAC 130 and the FPGA 110 to operate stably is 200 MHz and the defined frequency of the signal output from the DAC 130 is 60 MHz. Then the controller 104 defines the frequency of the clock signal 140 as 240 MHz and the frequency division ratio of the frequency divider 112 as 4. The defined clock frequency is provided to the clock generator 106 and the defined frequency ratio is provided to the frequency divider 112. In the present embodiment, the frequency division ratio may be provided for the clock-thinning-out unit 116. The clock generator 106 generates the clock signal 140 at the defined clock frequency and the frequency divider 112 divides the frequency of the clock signal 140 using the defined frequency division ratio and generates the frequency-divided clock signal 144, accordingly.

Figure 6:
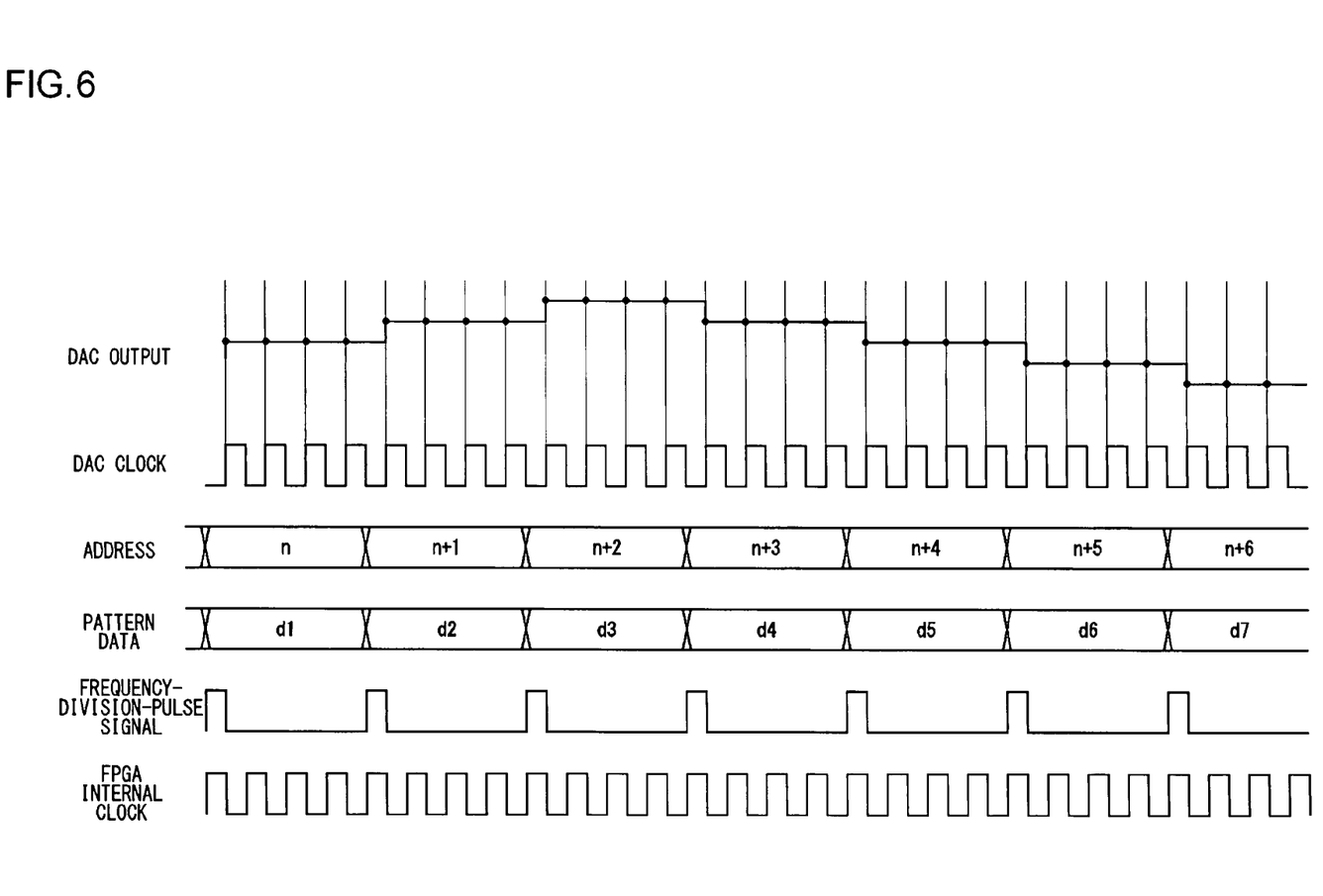
FIG. 6 shows the output from the DAC when pattern data is read out from the waveform memory at the period of the clock signal obtained by dividing the frequency of the clock signal, in the waveform generator that contains the frequency divider according to the present embodiment.

FIG. 6 shows a signal output from the DAC 130 when the pattern data is read out from the waveform memory 120 at the period of the frequency-divided clock signal 144 in the waveform generator 10 that contains the frequency divider 112 according to the present embodiment. In FIG. 6, the frequency-divided clock signal 144 is generated by dividing the frequency of the clock signal 140 by 4. In this manner, by providing the frequency divider 112 in the waveform generator 10, the cycle period for reading data from the waveform memory 120 can be extended. This enables to input the same data into the DAC 130 over a range of a plurality of sampling periods. Thus, the frequency output from DAC 130 can be decreased, seemingly.

Further, by enabling to input the same data into the DAC 130 over a range of a plurality of sampling periods, the pattern data to be retained by the waveform memory 120 needs not to have the overlapped data values in repetition, which allows to make use of the waveform memory 120, effectively. In the above described example, the frequency is divided by 4 and the amount of data is reduced to one fourth in comparison with the pattern data shown in FIG. 5. In case that a larger frequency division ratio is required, the amount of data can be further reduced in comparison with the pattern data shown in FIG. 5.

Figure 7:
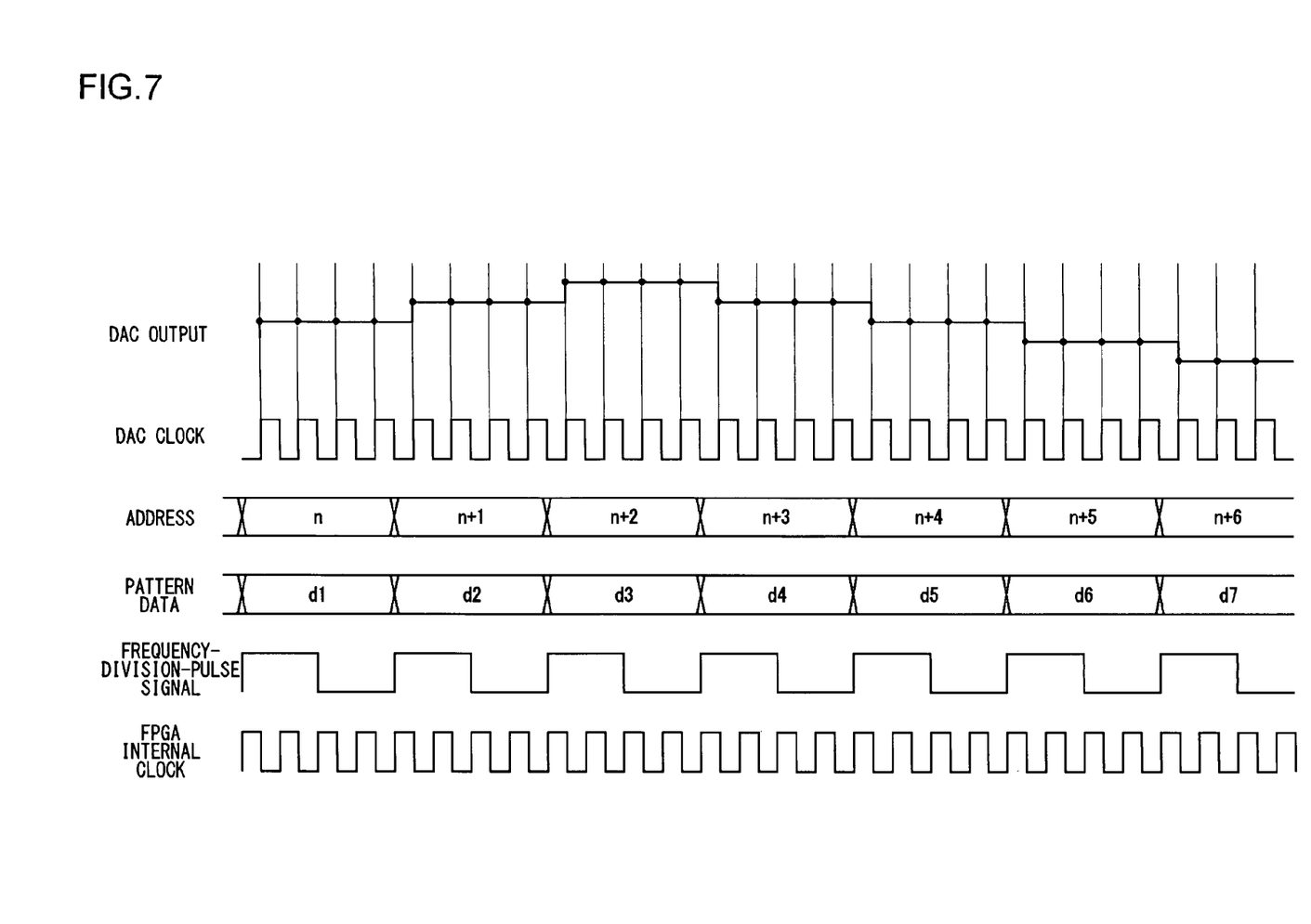
FIG. 7 shows the output from the DAC in the same condition as in FIG. 6 except that the frequency-divided clock signal is generated while the duty ratio thereof is defined as 50 percents.

FIG. 7 shows the output from the DAC 130 in the same condition as in FIG. 6 except that the frequency-divided clock signal 144 is generated, while the duty ratio thereof is defined as 50 percents. The reader 118 provides an address signal to the waveform memory 120 at the rising edges or the falling edges of the clock signal. Therefore, regardless of the duty ratio of the frequency-divided clock signal 144, the DAC 130 can decrease the seeming frequency of the output.

While the preferred embodiment of the present invention has been described above using specific terms, such description is for illustrative purposes only, and it is to be understood that optional combinations of the aforementioned elements may also be practiced as additional modes of the present invention. In the embodiment, the explanation has been given in case where the frequency of the clock signal 140 generated by the clock generator 106 is determined based on the frequency with which the DAC 130 and the FPGA 110 can operate. However, in case there is no limitation on the operation frequency of the FPGA 110, the frequency of the clock signal 140 may be determined based on the minimum operation frequency of the DAC 130.

In the embodiment, it is assumed that the internal clock provider 114 generates the internal clock signal 142 of the FPGA 110 without changing the frequency of the clock signal 140. However, the internal clock provider 114 may also has a function to multiply a frequency or to divide a frequency. In this case, the clock generator 106 may generates the clock signal 140 based on the minimum operation frequency of the DAC 130 as a reference frequency, the internal clock provider 114 may adjust the generated clock signal 140 to the frequency with which the FPGA 110 can operate and may convert the clock signal 140 to the internal clock signal 142.

The frequency divider 112 may be a programmable frequency divider that generates a signal with an arbitrary frequency division ratio. Alternatively, the frequency divider 112 may be structured simply, making use of a counter or the like, so as to generate a signal having the frequency division ratio of $2^m$ (m is an integer). Also in this case, the clock generator 106 can generate the clock signal 140 with an arbitrary frequency, it is possible to make the DAC 130 to output a waveform with a desired frequency.

A known circuit can be used for thinning out the clock pulse performed by the clock-thinning-out unit 116, e.g., picking the first pulse in every four pulses periodically. For example, the internal clock signal 142 is applied to a trigger terminal of a binary counter and among the signals output from this counter, the lowest bit b0 and the next bit b1 are connected to an AND gate having two input terminals. In this case, a signal output from the AND gate becomes the frequency-divided clock signal 144, which is the internal clock signal 142 divided-by-4.

As described above, the controller 104 determines the frequency of the clock signal 140 to generate and the frequency division ratio used by the frequency divider 112, based on the frequency of the signal, defined by the input unit 102 and output from the DAC 130, and also based on the frequency with which both the DAC 130 and the FPGA 110 can operate. In this process, a plurality of combinations of the clock signal 140 and the frequency divider 112 may be generated. In this case, the controller 104 preferably selects a lower clock frequency. Since the FPGA 110, the DAC 130 or the like consist of circuit elements, the amount of heat generated increases as they operate at a high speed. Therefore, it is preferable to reduce the amount of heat generated by the entire apparatus and to maintain a test environment properly by allowing the unit to operate at the lowest possible clock frequency.

What is claimed is:

1. A waveform generator for generating a waveform, comprising:
   a memory operative to retain pattern data indicating a pattern of a waveform;
   a clock signal generator operative to generate a clock signal;
   a reader operative to read the pattern data from the memory at a frequency obtained by dividing the frequency of the clock signal; and
   a digital-to-analog converter operative to receive the pattern data read at a divided frequency and subject the pattern data to digital-to-analog conversion at the frequency of the clock signal so as to output a waveform having same value over a period defined by the divided frequency and varying in level at the divided frequency.

2. The waveform generator according to claim 1 further comprising a frequency divider operative to divide the frequency of the clock signal.

3. The waveform generator according to claim 2, wherein the frequency divider divides the frequency of the clock signal by thinning out the pulses of the clock signals.

4. A test apparatus including a waveform generator for providing a test waveform to a device to be tested, wherein the waveform generator comprises:
   a memory operative to retain pattern data indicating a pattern of a waveform;
   a clock signal generator operative to generate a clock signal;
   a reader operative to read the pattern data from the memory at a frequency obtained by dividing the frequency of the clock signal; and
   a digital-to-analog converter operative to receive the pattern data read at a divided frequency and subject the pattern data to digital-to-analog conversion at the frequency of the clock signal so as to output a waveform having same value over a period defined by the divided frequency and varying in level at the divided frequency.

5. The test apparatus according to claim 4, wherein the waveform generator further comprises a frequency divider operative to divide the frequency of the clock signal.

6. The test apparatus according to claim 5, wherein the frequency divider divides the frequency of the clock signal by thinning out the pulses of the clock signals.

* * * * *